(12) United States Patent
Schofield

(10) Patent No.: US 11,885,341 B2
(45) Date of Patent: Jan. 30, 2024

(54) ROTOR SUPPORT AND VACUUM PUMP WITH SUCH A ROTOR SUPPORT

(71) Applicant: Edwards Limited, Burgess Hill (GB)

(72) Inventor: Nigel Paul Schofield, Burgess Hill (GB)

(73) Assignee: Edwards Limited, Burgess Hill (GB)

(*) Notice: Subject to any disclaimer, the term of this patent is extended or adjusted under 35 U.S.C. 154(b) by 90 days.

(21) Appl. No.: 17/617,795

(22) PCT Filed: Jun. 2, 2020

(86) PCT No.: PCT/EP2020/065222
§ 371 (c)(1),
(2) Date: Dec. 9, 2021

(87) PCT Pub. No.: WO2020/249431
PCT Pub. Date: Dec. 17, 2020

(65) Prior Publication Data
US 2022/0235778 A1    Jul. 28, 2022

(30) Foreign Application Priority Data

Jun. 10, 2019 (GB) ..................... 1908277

(51) Int. Cl.
*F04D 19/04* (2006.01)
*F04D 29/059* (2006.01)
*F04D 29/66* (2006.01)

(52) U.S. Cl.
CPC ......... *F04D 19/042* (2013.01); *F04D 29/059* (2013.01); *F04D 29/668* (2013.01)

(58) Field of Classification Search
CPC ...... F01D 25/164; F04D 19/04; F04D 19/042; F04D 29/059; F04D 29/668;
(Continued)

(56) References Cited

U.S. PATENT DOCUMENTS 4,971,458 A * 11/1990 Carlson ................ F01D 25/164
384/99
7,553,123 B2 * 6/2009 Casaro .................... F04D 19/04
384/536

(Continued)

FOREIGN PATENT DOCUMENTS

DE        2400701        7/1974
DE     19709205 A1      9/1998
(Continued)

OTHER PUBLICATIONS

British Examination Report dated Nov. 19, 2019 and Search Report dated Nov. 18, 2019 for corresponding British Application No. GB1908277.5, 8 pages.

(Continued)

*Primary Examiner* — Jesse S Bogue
(74) *Attorney, Agent, or Firm* — Theodore M. Magee; Westman, Champlin & Koehler, P.A.

(57) ABSTRACT

A rotor support configured to rotatably mount a rotor shaft in a vacuum pump is disclosed. The rotor support comprises: a rolling bearing for rotatably supporting the shaft; an insert and at least one resilient damping member, the insert and the at least one resilient damping member surrounding the rolling bearing. The insert comprises inner and outer annular portions connected by a plurality of flexible members, the plurality of flexible members being configured to flex in a radial plane and resist movement in an axial plane, thereby absorbing radial movement of the shaft. The at least one resilient damping member is formed of an elastomeric material configured to flex in both a radial and axial direction.

15 Claims, 2 Drawing Sheets

(58) Field of Classification Search
CPC .............. F05D 2300/43; F16C 2360/45; F16C 27/066; F16F 1/027; F16F 3/12
See application file for complete search history.

(56) References Cited

U.S. PATENT DOCUMENTS

| | | | | |
|---|---|---|---|---|
| 7,828,512 | B2 * | 11/2010 | Eilers .................... | F04D 29/668 |
| | | | | 415/199.5 |
| 8,186,937 | B2 * | 5/2012 | Brewster ............. | F04D 29/0563 |
| | | | | 415/119 |
| 8,851,829 | B2 * | 10/2014 | Brewster ............... | F04D 19/042 |
| | | | | 415/119 |
| 2010/0068054 | A1 | 3/2010 | Tollner et al. | |

FOREIGN PATENT DOCUMENTS

| | | | |
|---|---|---|---|
| GB | 2415019 | A | 12/2005 |
| GB | 2557676 | A | 6/2018 |
| WO | 2006131694 | A1 | 12/2006 |
| WO | 2008093134 | A1 | 8/2008 |

OTHER PUBLICATIONS

International Search Report and Written Opinion dated Sep. 11, 2020 for corresponding PCT application Serial No. PCT/EP2020/065222, 7 pages.

* cited by examiner

ROTOR SUPPORT AND VACUUM PUMP
WITH SUCH A ROTOR SUPPORT

CROSS-REFERENCE OF RELATED
APPLICATION

This application is a Section 371 National Stage Application of International Application No. PCT/EP2020/065222, filed Jun. 2, 2020, and published as WO 2020/249431 A1 on Dec. 17, 2020, the content of which is hereby incorporated by reference in its entirety and which claims priority of British Application No. 1908277.5, filed Jun. 10, 2019.

FIELD

The field of the invention relates to vacuum pumps, and to rotor supports or mounting means for supporting a rotating shaft of a vacuum pump.

BACKGROUND

Vacuum pumps such as turbomolecular pumps typically comprise a body and a rotor supported for rotation relative to the body. The rotor when rotating draws gas from a tool connected to the inlet of the pump. The rotor is supported by a bearing arrangement. In some cases there are two bearings, the upper bearing being in the form of a magnetic bearing, and the lower bearing in the form of a rolling bearing.

It is important in such pumps that the rotor is mounted in an axially stiff manner, such that the clearances between rotor and stator components are maintained and the magnetic bearings operate effectively. However, it is also important in some applications that vibrations that arise due to rotation of the rotor are isolated from the pump body to impede these vibrations being transmitted to the tool connected to the inlet. This is particularly the case in scientific instruments such as electron microscopes.

A further issue with mounting the shaft arises when the pump is serviced and the bearings need to be replaced. Using new bearings within such a pump conventionally requires the pump to be rebalanced, however, were a bearing with sufficient radial flexibility to be used that also had axial stiffness, this rebalancing step might be dispensed with allowing the pump to be serviced in the field.

Some of these issues have been addressed using an insert or compact metal spring damper as disclosed in EP2126365 which is used to mount the bearings to the body of the pump and provide axial stiffness and radial flexibility.

However the amount of vibrations transmitted to the pump body is still too high for some applications. This is particularly, the case where the rolling bearings become worn and high frequency vibrations may be transmitted between the rotor and the pump body.

It would be desirable to provide a pump with improved isolation from vibrations due to the rotating rotor.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides a rotor support configured to rotatably mount a rotor shaft in a vacuum pump, said rotor support comprising: a rolling bearing for rotatably supporting said shaft; an insert and at least one resilient damping member, said insert and said at least one resilient damping member surrounding said rolling bearing; wherein said insert comprises inner and outer annular portions connected by a plurality of flexible members, said plurality of flexible members being configured to flex in a radial plane and resist movement in an axial plane, thereby absorbing radial movement of said shaft; and said at least one resilient damping member is formed of an elastomeric material configured to flex in both a radial and axial direction; wherein said at least one resilient damping member is configured to support said insert and is arranged in series with said insert.

The inventor of the present invention recognised that although axial stiffness and some radial flexibility are desirable when mounting a rotor in a vacuum pump where both accurate axial positioning of the rotor and low vibrations are important, the use of an insert where the axial stiffness is too high may provide a path for vibrations to travel between the rotor, bearings and pump body.

Providing some further isolation between the bearings and pump body may help alleviate this problem, while still providing acceptable axial positioning. In particular, providing an elastomeric material that has both axial and radial flexibility to support the insert and that is arranged in series with it provides isolation and damping of vibrations.

The resilient damping member is located in series with the insert such that it may be located between the ball bearing and the insert and/or it may be located around the outer surface of the insert such that it is located between the pump housing and the outer annular portion of the insert when the rotor support is supporting a rotor in a pump. In effect providing a resilient damping member in series with the insert when mounting the rotor allows the rotor support to provide the functionality of axial stiffness of the insert while providing improved isolation from vibrations due to the additional flexibility of the damping member between the ball bearing and pump housing.

It should be noted that although an elastomeric material provides flexibility in both axial and radial directions and good isolation from vibrations, the more flexible the elastomer the greater both the radial and axial flexibility are, such that independent control of each is to some extent lost. However, the use of a resilient member formed of elastomeric material in conjunction with an insert which is configured to provide radial flexibility with axial stiffness, is a combination that allows both a degree of independent control of the amount of axial and radial stiffness through design of the insert, while providing additional isolation to reduce vibration transmission with the damping member.

In some embodiments, said resilient damping member is arranged in series with said insert in at least one of the following configurations: at least one of said at least one resilient damping member is located between said insert and said rolling bearing; and said outer annular portion of said insert is located between at least one of said at least one resilient damping member and said rolling bearing.

In some embodiments, said insert is formed of a stiff material and said flexible members are longer axially than they are wide, thereby providing axial stiffness and radial flexibility.

The axial stiffness and radial flexibility may be provided by making the insert of a stiff material such as a metallic or plastic material and making the flexible members axially long so that they resist bending in an axial direction, while being relatively thin so that they can flex radially. In this way the degree of flexibility in each direction is built into the design with the material and dimensions of the flexible members.

Where the insert is made of a metallic material, then the metal to metal junctions between the insert and the pump body and the insert and the rolling bearing provide a path for vibrations which can be effectively impeded where an elastomeric material is used to interrupt the path. A plastic material may of itself reduce some of the vibration transmission, however, a further resilient member will impede the vibrations still further.

Although the flexible members can be formed in a number of ways, in some embodiments, each of the flexible members comprises an elongate, arcuate member substantially concentric with the inner and outer annular portions.

In some embodiments, the flexible members provide a plurality of integral leaf springs providing radial flexibility.

In some embodiments, said rolling bearing comprises an inner race, an outer race and a plurality of rolling elements located between the races, said outer race being bonded to said insert.

It should be noted that the resilient damping member may be located between the insert and pump body when mounting the rotor to the pump, or between the insert and the rolling bearing. Where the insert is bonded to the rolling bearing it may be directly bonded to them, or where the resilient damping member is between the rolling bearing and the insert, the resilient damping member may be bonded to the rolling bearing and the insert to the resilient damping member. Bonding the insert to the rolling bearing, allows them to be accurately and consistently located axially with respect to each other.

In some embodiments, said at least one resilient damping member is located between said insert and said rolling bearing.

Alternatively or additionally, said insert is located between said rolling bearing and said resilient damping member.

Where the insert is located adjacent to the rolling bearing then the bonding of the insert to the rolling bearing may be more easily and effectively performed. The bonding of the elastomeric materials may be more difficult and in some embodiments they will not be bonded.

In some embodiments, the rotor support further comprises at least one resilient axial damping member formed of an elastomeric material and mounted such that axial movement of said rolling bearing changes a compression on said resilient axial damping movement.

As noted previously using an insert formed of a stiff material with little axial flexibility may allow some vibrational noise to be transmitted to the pump body. This is reduced with a resilient damping means providing some axial and radial flexibility. However, the axial flexibility should be limited and it may be further limited with a resilient axial damping member which is configured such that axial movement compresses or squashes the material, providing an effective resistance to axial movement. The resilient damping member that provides radial support is sheared by axial forces and may provide less resistance to axial displacement.

In some embodiments, said at least one resilient axial damping member is mounted on an outer surface in a radial plane of said rotor support.

In some embodiments, in order to provide additional axial stability the resilient axial damping member may be mounted on a surface that lies in a radial plane, that is perpendicular to the axis of the shaft and is configured such that when mounted in the pump it cooperates with a similarly radially extending surface on the pump, such that the resilient axial damping member is mounted between the two surfaces, relative axial movement of the surfaces towards each other compressing the damping member by different amounts.

In some embodiments, said insert comprises an extension extending inwardly from an end of said inner annular member, said surface extending over said rolling bearing, said resilient axial member being mounted between a surface of said rolling bearing facing said extension and a surface of said extension facing said rolling bearing.

The surface in the radial plane may be on an extension of the inner annular member of the insert which extends radially across and axially displaced from an end surface the rolling bearing so that the resilient axial member is mounted between the extending surface and the rolling bearing surface.

In some embodiments, said at least one resilient damping member is axially more flexible than said resilient axial damping means.

The resilient axial damping member is provided to impart a higher axial stiffness than the at least one resilient damping member which may be more than 1.5 times as axially flexible as said resilient axial damping member. This may be due to its shape, and/or the fact that it is mounted between two surfaces in the radial plane, so that axial movement compresses it, and/or it may be due to the material it is formed of.

In some embodiments, said resilient axial damping member comprises a member with a substantially rectangular cross section when not compressed.

The resilient axial damping member may be a gasket with a flat type shape and a rectangular cross section.

In some embodiments, said resilient axial damping member and said at least one resilient damping member comprise a single member.

In some embodiments they comprise a single L-shaped member.

Although the two or more damping members may be formed separately, in some embodiments, they may be formed as a single piece, perhaps as an L-shaped member, operable to provide an elastomeric element both in a radial path between components and in an axial path between components.

In some embodiments, said at least one resilient damping member comprises at least one O-ring.

The at least one resilient damping member may be one or more O-rings which allow the roller bearing and insert to be slid into position within the pump.

A second aspect provides a vacuum pump comprising: a rotor comprising a shaft rotatably mounted within a pump body on a rotor support, said rotor support comprising a rotor support according to a first aspect.

In some embodiments, an outer one of said at least one resilient damping member or said insert are bonded to said pump body.

The rotor support may be bonded to the pump, which will provide additional axial stability, in such a case a resilient axial damping member may not be used.

In some embodiments, said O-ring is mounted in a recess on said pump body.

The O-ring(s) may be mounted within recess(es) in the pump body, allowing the rotor support to be slid into position.

In some embodiments, said vacuum pump comprises a turbomolecular pump.

Turbomolecular pumps are often used to provide the high vacuums necessary for some scientific analysis and in such cases a low vibrational environment may be required. This is for example the case with electron microscopes. Thus, providing these pumps with means for isolating the rotors from the pump body can improve their performance.

In some embodiments, said vacuum pump comprising further bearings, said further bearings comprising magnetic bearings, said rolling bearings being mounted towards one end of said shaft and said magnetic bearings towards an opposing end.

Many pumps such as turbomolecular pumps have magnetic bearings to reduce frictional forces and provide clean bearings that can be used close to the pump inlet. These magnetic bearings require the axial positioning of the shaft to be accurately controlled for them to be effective, they also provide axial loading on the shaft biasing the shaft towards the bearings. This biasing can hold the shaft in position in particular when used in conjunction with the resilient axial damping members located between two radially extending surfaces, one associated with the rotor support and one with the pump body.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

To improve the vibration levels of a vacuum pump and in particular, a turbo pump with an insert in the form of a compact metal or plastic spring damper, an elastomeric element is added in series with the compact metal spring damper CMSD or insert.

In applications such as pumping electron microscopes the level of vibration caused by the turbo pump is very critical to the microscope resolution. To reduce the level of vibration caused by the pump a compact metal spring damper may be used to mount the ball bearings. This uses circumferential spring elements to give a low radial stiffness, but high axial stiffness, thus absorbing radial movement of the shaft due to imbalance, but maintaining a good axial location of the rotor. This achieves a high level of isolation and a good vibration performance, however there is still room for improvement in the most demanding applications.

Embodiments seek to enhance the performance of such an insert by using an elastomeric element to support the insert, giving a degree of axial and radial compliance and further isolating the bearing noise and vibration from the main pump housing.

The compliant element may be made up of one or more components, such as one or more O-rings for radial location and a flat elastomeric 'washer' for axial location. Alternatively an 'L' shaped elastomeric component could provide both axial and radial location.

In one embodiment, the elastomeric element(s) is/are mounted between the insert and pump housing, alternatively, or additionally, they are mounted between the bearing and insert.

This arrangement is used in pumps with a single ball bearing and a passive magnetic bearing or in pumps with two ball bearings supporting the shaft.

Figure 1:
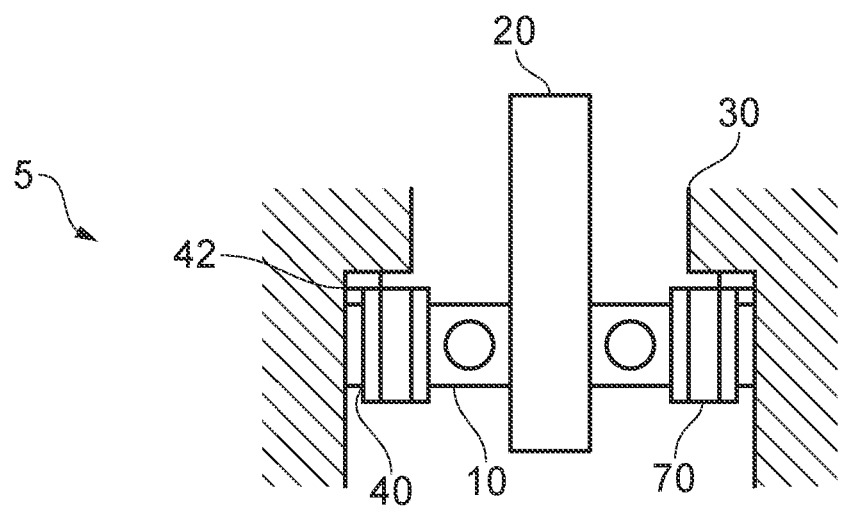
FIG. 1 shows a cross section through a rotor support means according to a first embodiment.

FIG. 1 shows a cross section through a rotor shaft 20 that is supported by a rotor shaft support 5 according to an embodiment. The rotor shaft support 5 comprises rolling bearings 10 which are held in position by a compact metal spring damper or insert 70. Insert 70 is in this embodiment bonded to the bearing 10 with adhesive. Insert 70 provides axial stiffness and some radial flexibility for the bearing 10, helping to maintain them in position while allowing some radial movement to absorb vibrations. The rotor shaft 20 is the shaft of a turbomolecular pump.

Insert 70 is mounted to pump body 30 via a resilient damping member 40 formed of elastomeric material mounted between the insert 70 and the pump body 30. This resilient damping member 40 has some axial and radial flexibility and helps reduce vibrations still further. In some embodiments, the shaft is held in position by adhering the rotor support to the pump body 30, however, in this embodiment, the rotor support is held in position by a further resilient damping member in this case an axial resilient damping member 42.

Axial resilient damping member 42 is mounted between a projecting portion of the pump housing 30 and the upper surface of the insert 70. In this embodiment axial resilient damping member 42 is a ring shaped gasket. The resilient damping member 40 has an annular form and is thicker than the flat gasket 42 allowing more axial movement. Gasket 42 is arranged such that axial movement of the bearing compresses the gasket and thus, axial movement is resisted.

Shaft 20 is mounted on a rolling bearing 10 located towards the outlet end of the pump and on magnetic bearings (not shown) located towards the inlet end of the pump. These magnetic bearing provide the biasing force to hold the insert 70 against gasket 42. In this way gasket 42 helps provide axial alignment of the rotor shaft 20, while its elasticity helps reduce vibration transmission from the rolling bearing 10 to the pump body 30 along the axial path. The elasticity of gasket 42 is selected to be relatively low such that axial movement is restricted and axial alignment is maintained within acceptable limits. The elasticity of resilient member 40 is selected to be higher providing more flexibility and reducing vibration transmission particularly in the radial path between the insert 70 and pump body 30.

Figure 2:
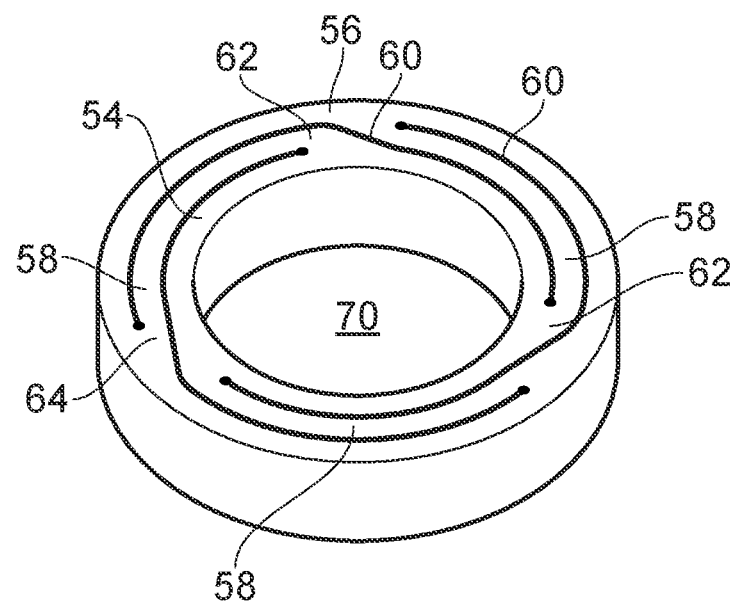
FIG. 2 shows the insert of the rotor support means of FIG. 1.

FIG. 2 shows the insert 70 in more detail. The insert 70 is provided to mount the shaft within the rolling bearing in a way that is axially stiff and radially flexible. In this embodiment insert 70 is formed of a metallic material, although in other embodiments it may be formed of a plastic.

Insert 70 has integral inner and outer annular portions 54, 56 connected together by a plurality of flexible members 58. In this embodiment they are formed by machining slots 60 in the insert 70. Each flexible member 58 is connected by a first resilient hinge 62 to the inner portion 54, and by a second resilient hinge 64 to the outer portion 56. Each flexible member 58 is in the form of an elongate, arcuate member substantially concentric with the inner and outer annular portions 54, 56, and, as illustrated in FIG. 2, the flexible members 58 are preferably circumferentially aligned. The flexible members 58 of the resilient support 52 thus provide integral leaf springs of the resilient support or insert 70. As can be appreciated the elasticity of the insert 70 in each of the radial and axial directions is dependent upon the material of the insert and the thickness and shape of the flexible members 58 and on their hinged portions 64, 62. Thus, the insert can be designed according to requirements, with desired axial and radial properties.

Figure 3:
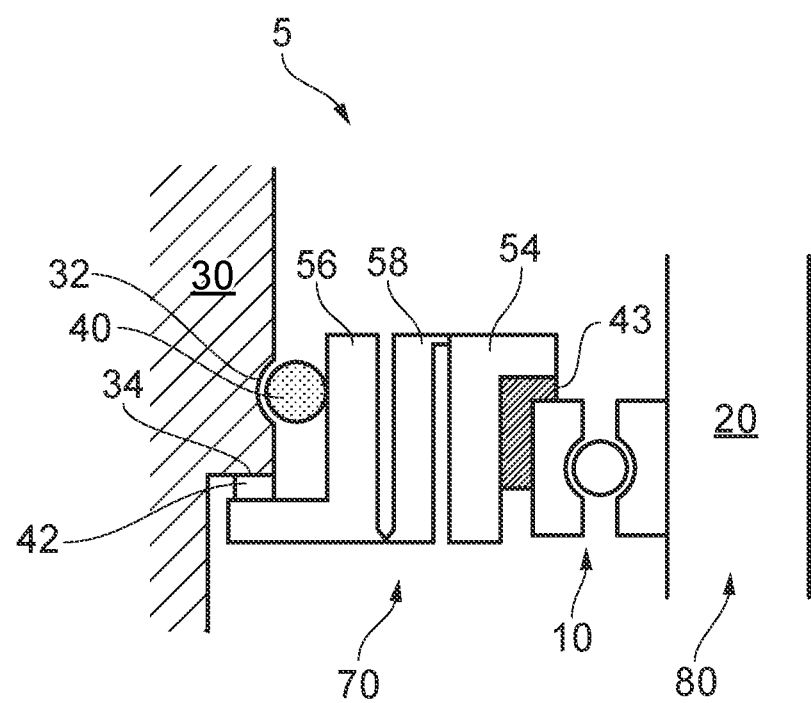
FIG. 3 shows a cross section through one side of a rotor support means according to a further embodiment.

FIG. 3 shows an alternative embodiment of a cross section through one side of a rotor support 5 configured to support shaft 20 of a vacuum pump rotor within pump body 30. Rotor support 5 comprises insert 70, rolling bearing 10 and resilient members 40, 42 and 43.

In this embodiment, shaft 20 is mounted via the rotor support 5 towards the outlet end of the pump and on magnetic bearings (not shown) towards the inlet end of the pump. The magnetic bearings provide a biasing force 80 on shaft 20 which biases it against axial resilient member 42 and a portion of resilient member 43.

It should be appreciated that the flexible resilient members may be located either between the rolling bearing 10 and insert 70 and/or between the insert 70 and pump body 30. In this embodiment they are mounted between both, but in some embodiments there are only flexible resilient members 40 and 42 or flexible resilient member 43.

The resilient members may be bonded to the rolling bearing 10 and insert 70 and to the pump body wall 30, however, generally they are held in position by their elasticity.

In the embodiment of FIG. 3 rolling bearing 10 is adhered to shaft 20. Insert 70 lies between pump body 30 and rolling bearing 10 and there is an L-shaped resilient member 43 between the rolling bearing 10 and insert 70. The L-shaped resilient member is formed of an elastomeric material and has a narrower cross sectional width along the radially extending portion than along the axially extending portion. There are further resilient members between the insert 70 and the pump body 30. These comprise O-ring 40 located in recess 32 in the pump body wall and axial resilient member 42. In other embodiments L-shaped resilient member 43 may be replaced by two separate resilient members, a ring gasket arranged to lie on the upper surface of rolling bearing 10 and an annular elastomeric damping member arranged to lie around the outer surface of bearing 10 and adjacent to the inner surface of insert 70.

Insert 70 has an inner annular member 54 with a radially inwardly extending portion at one axial end that extends over the rolling bearing 10 and provides a surface for a portion of the L-shaped resilient member 43 that extends over the axial end surface of rolling bearing 10 to abut with and provide additional axial stability. The insert further has a central flexible member 58 extending from the outer annular member 56 to the inner annular member 54 and providing radial flexibility while also biasing the rolling bearings towards a central position. The outer annular member 56 has a radially outwardly extending portion at the other axial end to the radially inwardly extending portion that provides a surface parallel to a protruding portion 34 of the pump wall body 30. Axial resilient member 42 which is in the form of a gasket is located between the two parallel radially extending surfaces and provides additional axial stability. In this embodiment biasing force 80 biases the bearing against L-shaped member 43 and the insert 70 against resilient member 42 holding the support axially in place, the biasing force 80 resisting axial movement in the downward direction and the two resilient members 42, 43 resisting it in the upwards direction and acting to damp any axial vibrations.

O-ring 40 and the axially extending portion of L-shaped resilient member 43 provide damping of vibrations travelling radially from the shaft and bearings towards the pump body 30. The O-ring 40 is mounted in a recess 32 of pump body wall 30 and this allows it to be held in place while the insert, shaft and bearing are slid into position.

Were the rolling bearing 10 to need to be replaced, then the arrangement of the rotor support 5 will help to accurately position the shaft both radially and axially allowing the bearings to be changed in the field without the need for rebalancing.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A rotor support configured to rotatably mount a rotor shaft in a vacuum pump, said rotor support comprising:
  a rolling bearing for rotatably supporting said shaft;
  an insert and at least one resilient damping member, said insert and said at least one resilient damping member surrounding said rolling bearing; wherein
  said insert comprises inner and outer annular portions connected by a plurality of flexible members, said plurality of flexible members being configured to flex in a radial plane and resist movement in an axial plane, thereby absorbing radial movement of said shaft; and
  said at least one resilient damping member is formed of an elastomeric material configured to flex in both a radial and axial direction; wherein
  said at least one resilient damping member is configured to support said insert and is in at least one of the following configurations with said insert:
  at least one of said at least one resilient damping member is located between said inner annular portion of said insert and said rolling bearing; and
  said outer annular portion of said insert is located between at least one of said at least one resilient damping member and said rolling bearing.

2. The rotor support according to claim 1, wherein said insert is formed of a stiff material and said flexible members are longer in the axial direction than they are in the radial direction, thereby providing axial stiffness and radial flexibility.

3. The rotor support according to claim 2, wherein said stiff material comprises a metallic material or a plastic material.

4. The rotor support according to claim 1, wherein each of the flexible members comprises an elongate, arcuate member substantially concentric with the inner and outer annular portions.

5. The rotor support according to claim 1, wherein the flexible members provide a plurality of integral leaf springs providing radial flexibility.

6. The rotor support according to claim 1, wherein said rolling bearing comprises an inner race, an outer race and a plurality of rolling elements located between the races, said outer race being bonded to said insert.

7. The rotor support according to claim 1, wherein at least one of said at least one resilient damping member is located between said insert and said rolling bearing.

8. The rotor support according to claim 1, wherein said insert is located between said rolling bearing and at least one of said at least one resilient damping member.

9. The rotor support according to claim 1, further comprising
at least one resilient axial damping member formed of an elastomeric material and mounted such that axial movement of said rolling bearing changes a compression of said at least one resilient axial damping movement.

10. The rotor support according to claim 7, wherein at least one of said at least one resilient damping member is located between said insert and said rolling bearing and wherein at least one of said at least one resilient axial damping member is mounted on an outer surface of said rotor support extending in a radial plane.

11. The rotor support according to claim 8, wherein said insert is located between said rolling bearing and at least one of said at least one resilient damping member and wherein said insert comprises an extension extending radially inwardly from an end of said inner annular member, said surface extending over said rolling bearing, at least one of said at least one resilient axial member being mounted between a surface of said rolling bearing facing said extension and a surface of said extension facing said rolling bearing.

12. The rotor support according to claim 9, wherein said at least one resilient damping member is axially more flexible than said resilient axial damping means.

13. The rotor support according to claim 9, wherein said resilient axial damping member and said resilient damping member comprise a single member.

14. The rotor support according to claim 13, wherein said single member comprises an L-shaped member.

15. The rotor support according to claim 1, wherein said at least one resilient damping member comprises at least one O-ring.

* * * * *